(No Model.) 2 Sheets—Sheet 1.

W. W. WHIDDIT.
FILTER.

No. 444,623. Patented Jan. 13, 1891.

WITNESSES
Harry King
C. M. H. Arnold

INVENTOR
William W. Whiddit
By Irving Ulring
Attorney

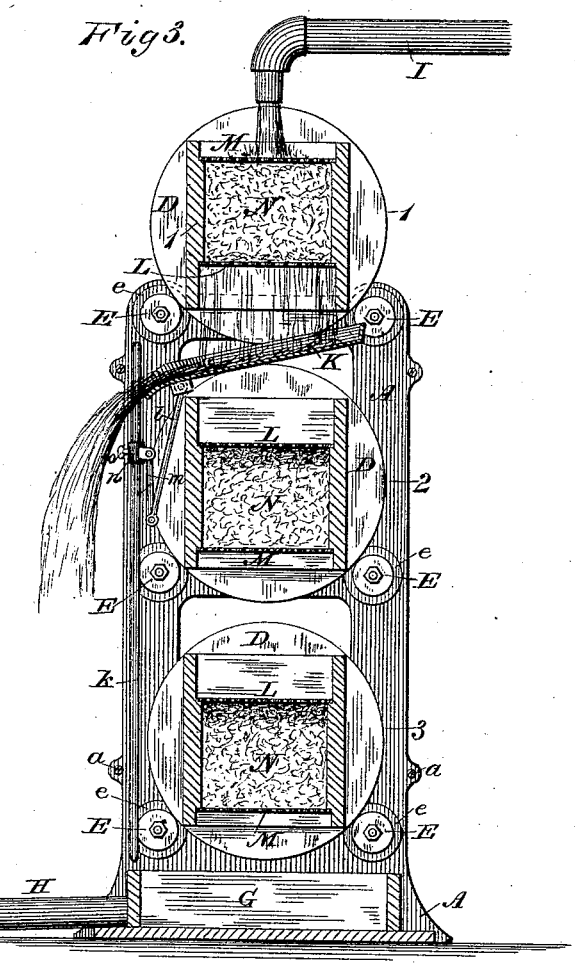

UNITED STATES PATENT OFFICE.

WILLIAM W. WHIDDIT, OF NEWBURG, NEW YORK.

FILTER.

SPECIFICATION forming part of Letters Patent No. 444,623, dated January 13, 1891.

Application filed April 23, 1890. Serial No. 349,127. (No model.)

*To all whom it may concern:*

Be it known that I, WILLIAM W. WHIDDIT, a citizen of the United States, residing at Newburg, in the county of Orange and State of New York, have invented certain new and useful Improvements in Filters; and I do hereby declare the following to be a full, clear, and exact description of the invention, such as will enable others skilled in the art to which it appertains to make and use the same.

My invention relates to filters in which the filtering material is contained between perforated screens within several reversible reservoirs having open air-spaces between them; and the objects of my improvements are, first, to divide a given quantity of the filtering material into several portions, which facilitates rapid passage of the water; second, to furnish open air-spaces between the filtering-reservoirs, which serve to aerify or freshen the water; third, to provide for the convenient reversing of the filtering material, which permits a ready cleansing of the charcoal, and, fourth, to furnish a means for carrying off the dirty water during the cleansing process, so that it does not run into the reservoir or water below the charcoal which is being cleansed. I attain these objects by the mechanism illustrated in the accompanying drawings, in which—

Figure 1:
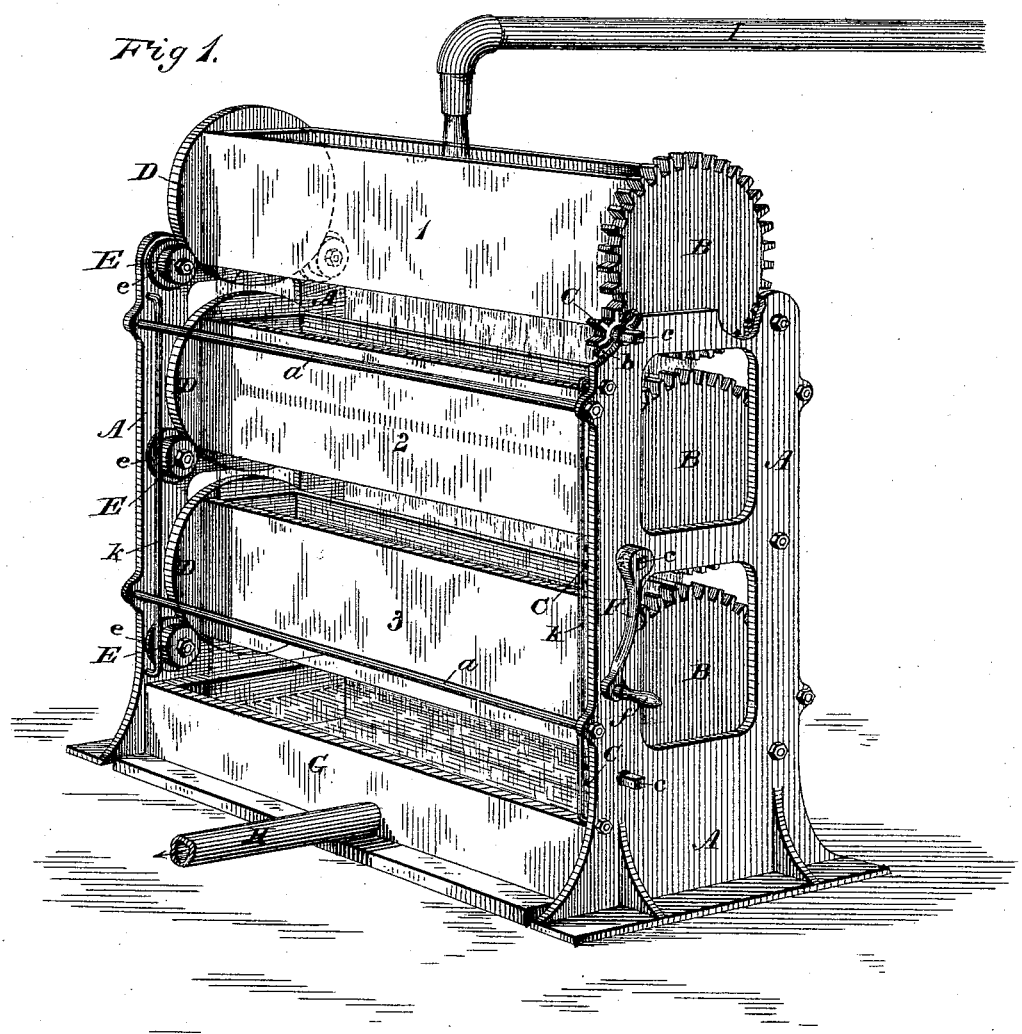
Figure 2:
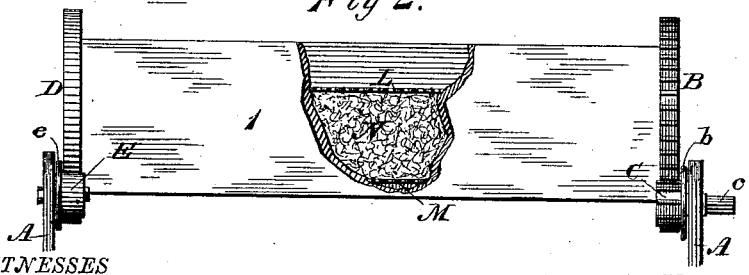

Figure 1 is a perspective view of my filter, showing it ready for work with inlet and outlet pipes, and three filter-reservoirs in their normal position. Fig. 2 is a front plan view of one of my filter-reservoirs having a portion of the side broken away to show the position of the filtering material and the perforated screens which confine it. Fig. 3 is a vertical cross-section of my filter, showing the upper reservoir reversed for cleansing and underneath it a movable adjustable discharge-screen for conveying the dirty water outside of the lower reservoirs during the cleansing process; and Fig. 4 is a perspective view of my removable discharge-screen, showing its supporting-rods and a convenient means of adjustment thereupon.

Similar letters and figures refer to similar parts throughout the several views.

The frame-work A A, strengthened by stay-rods $a$ $a$, may be made of any suitable material, preferably of metal, for the convenient support of any desired number of reservoirs. (Shown as 1, 2, and 3 in Fig. 1.) On one side of each reservoir is a cog-gearing B C $b$ $c$, to which the crank and handle F $f$ can be readily attached. On the opposite side the reservoirs move on the roller-bearings D E $e$, and are thus easily turned by F to their reverse positions for cleansing the filter, as shown in the upper portion of Fig. 3. Underneath the lower filter-reservoir is a delivery-reservoir G, with the outlet-pipe H, the latter of any desired size to correspond with the inlet-pipe I at the top, which supplies the water to be filtered. Within each filtering-reservoir the perforated screens L and M contain between them the filtering material, preferably bone charcoal. (Represented by N in Figs. 2 and 3.) In a reservoir of, say, twenty-eight inches in height, it is as well to have the depth of the charcoal only about one foot, a somewhat less thickness proportionately than is shown in the drawings. This permits a deeper reservoir-space above the filtering material for retaining the water and a quicker passage of the water through the filter, together with a more rapid and complete cleansing of the filter when the water is passed through in the reversed position shown in Fig. 3.

K represents a convenient form of screen for discharging the water passed through the reversed filter during the cleansing process, so that it cannot enter the reservoirs underneath. K is broad enough to rest upon the ends B D of the lower reservoir, and the upright rods $k$ $k$ on either side, attached to the frame-work A, serve to retain the screen or discharge-pan K in position for use under any reservoir by means of pivots and connecting-rods, (shown in Fig. 4 at $i$, $l$, and $m$ $m$,) being connected by pivot to the collars $n$ $n$, moving on $k$ $k$, and secured in any position thereon by the set-screws $o$ $o$. After the cleansing of the filters is completed the screen K may be drawn out from between the reservoirs and turned over the stay-rod $a$; or, if the upper ends of rods $k$ $k$ be left free, the collars $n$ $n$ may be run off the rods and K removed entirely from the filter until again required for use.

The screens L M may be made of wire-gauze, perforated metal, or any material that will serve to hold the charcoal in place to allow free passage of the fluid, and to act as a strainer for foreign substances. They may be made removable and adjustable at different positions in the reservoir, if desired.

It will be readily seen that my filter possesses many practical advantages over the ordinary filter. It may be increased to a very large size, having numerous service and discharge pipes without increasing the thickness of the filtering-beds and without preventing the easy reversal and complete cleansing of the reservoirs. At the same time the open air-spaces between the reservoirs and their filter-beds permits the constant aerifying and consequent freshening of the water, which is unattainable in most filters, but very essential to the perfect filtration of water to be used for drinking or household purposes. My filter, therefore, is especially adapted for the filtering of water needed in large quantities for city use, and the use of my device, as described, not only accomplishes an exceptionally perfect filtration for the elimination of deleterious matter, but it also decolorizes the water and delivers it pure in appearance as well as in fact.

I do not limit myself to the use of any special form or material in the construction of my filter, nor to any particular kind of filtering-bed; but What I do claim, and desire to secure by Letters Patent, is—

1. In a filter, the combination of a frame, reservoirs supported thereon, separated by open air-spaces, and containing screens for holding the filtering material, gearing for reversing the reservoirs, and an adjustable screen for carrying off the water underneath the filtering material during the cleansing of the filter, as set forth.

2. A filter composed of a frame A, reservoirs 1 2 3, supported and reversible upon frame-bearings C E, the interior screens L M, containing filtering material W, the delivery-reservoir G, inlet and outlet pipes I H, and the discharge-screen K, supported and adjustable upon frame-rods $k$ $k$, all substantially as and for the purpose described.

In testimony whereof I affix my signature in presence of two witnesses.

WILLIAM W. WHIDDIT.

Witnesses:
STEPHEN G. GUERNSEY,
IRVING ELTING.